United States Patent [19]

Borbely et al.

[11] Patent Number: 4,894,296

[45] Date of Patent: Jan. 16, 1990

[54] CATHODE FOR ZINC AIR CELLS

[75] Inventors: Alex Borbely, Framingham, Mass.; Jaynal Molla, Santa Clara, Calif.

[73] Assignee: Duracell Inc., Bethel, Conn.

[21] Appl. No.: 113,708

[22] Filed: Oct. 27, 1987

[51] Int. Cl.$^4$ .......................... H01M 4/00; B29C 59/00
[52] U.S. Cl. ........................................ 429/27; 429/42; 427/115; 269/122
[58] Field of Search .................... 429/27, 42; 427/115; 264/122

[56] References Cited

U.S. PATENT DOCUMENTS

| | | | |
|---|---|---|---|
| 3,925,100 | 12/1975 | Buzzolli | 429/29 |
| 4,172,183 | 10/1979 | Ruetschi | 429/224 X |
| 4,248,744 | 2/1981 | Masar et al. | 427/25 X |
| 4,280,973 | 7/1981 | Moskowitz et al. | 264/63 |
| 4,317,789 | 3/1982 | Groult et al. | 264/122 X |
| 4,604,336 | 8/1986 | Nardi | 429/224 |

*Primary Examiner*—Stephen J. Kalafut
*Attorney, Agent, or Firm*—Ronald S. Cornell; James B. McVeigh

[57] ABSTRACT

The invention relates to an improved hydrophobic cathode for use in a zinc-air cell, and to a method for making said cathode. The cathode comprises an admixture of discrete particles of gamma manganese dioxide and carbon and a polymeric halogenated hydrocarbon. The method includes the step of intensively milling the manganese dioxide to reduce the particle size thereof and homogeneously admixing the manganese dioxide with the carbon particles.

19 Claims, No Drawings

CATHODE FOR ZINC AIR CELLS

This invention relates to improved hydrophobic cathodes for zinc-air electrochemical cells and to a method for making same; and, in particular, to a method of making air cathodes using a physical mixture of discrete particles of manganese dioxide and carbon. The method provides cathodes comprising a relatively high proportion of manganese dioxide and carbon with a high surface area.

Generally, the present invention relates to a hydrophobic air cathode for use in zinc-air electrochemical cells wherein manganese dioxide is used as a catalyst for assisting the electrochemical reduction of oxygen. According to the present invention said hydrophobic cathode comprises an admixture of discrete particles of gamma-manganese dioxide and carbon and at least 20% of a suitable binder such as polytetrafluoroethylene. Additionally, the present invention relates to a method of making hydrophobic cathodes comprising the steps of intensively milling gamma manganese dioxide, admixing discrete particles of the milled manganese dioxide and particles of carbon, blending a polymeric binder material therein to form a cathode mix, and fabricating the cathode mix thus obtained into a cathode.

Heretofore, the manufacture of hydrophobic cathodes for use in commercial zinc-air cells used a cathode processing method wherein the manganese dioxide is chemically formed in the cathode mix by including a material such as manganese nitrate therein and heating to convert the material to manganese dioxide. Examples of chemical formation of manganese dioxide are found in U.S. Pat. Nos. 3,948,684; 4,256,545; and 4,269,961. On a commercial scale it is known that in order to control the heat of chemical reaction the manganese dioxide should be limited to 12% or less by weight so that a thermal runaway situation is avoided. Also, long reaction times, up to 130 hours, are necessary to control the rate of heating. Further, the carbon surface area should not exceed 400 $m^2$/gram in order to minimize the risk of spontaneous combustion.

Physical mixtures of manganese dioxide and carbon have not generally been used in hydrophobic cathodes for a variety of reasons. One problem with a physical mixture is that commercially available manganese dioxide has a particle size range of 50-100 microns and carbon particles are usually sub-micron size. Such a difference in particle sizes prevents the formation of a fine, homogeneous distribution of manganese dioxide and carbon, such as can be obtained by the chemical method. Finer particle size manganese dioxide is commercially available, but only at a significantly increased cost. An additional reason for not using a physical mixture is that is is generally believed that the intimate contact between manganese dioxide which is chemically deposited on the surface of carbon is necessary for optimum cathode performance.

The present invention relates to a method of making hydrophobic cathodes which uses a physical mixture of manganese dioxide and carbon which thereby avoids the limitations encountered in the chemical methods. A homogeneous admixture of discrete particles of manganese dioxide and carbon is obtainable by first intensively milling manganese dioxide particles having an average particle size greater than about 10 microns until the average particle size is reduced to less than about 10 microns and preferably less than about 7 microns. It has been discovered that attrition milling provides intensive milling which is not obtained by other milling techniques. Attrition milling has unique dispersing, grinding, beating and rubbing action between the milling media (hard spheres), the rotating arms, and the manganese dioxide particles that results in a very narrow particle size distribution. This action also makes attrition milling up to ten times faster than conventional ball milling and about 20 times faster than the chemical reaction methods discussed above. While attrition milling can be carried out on either dry or wet powder, it has been discovered that the wet process gives more efficient grinding.

The admixture is formed by admixing the desired amount of carbon with the manganese dioxide in the attrition mill or the milled manganese dioxide can be transferred to a high speed mixer and then carbon added. However, a more homogeneous mixture is obtained if the admixture is formed in the attrition mill. If the attrition mill is used, the carbon may be added to the manganese dioxide after the milling is complete or the carbon may be added a short time before milling is complete so that admixing step coincides with the later part of the milling step such that both steps end simultaneously.

The amount of manganese dioxide in the admixture is an amount which gives 20-50% manganese dioxide in the resulting dried cathode. It is preferred that at least 20% manganese dioxide be used because better performance at high rates is obtained. However, if greater than 50% manganese dioxide is used the cathode becomes too resistive which adversely effects performance. Such high levels of manganese dioxide can not be obtained on a commercial scale using the prior art chemical methods of making hydrophobic cathodes for the reasons set forth above.

The present invention allows the use of any crystal structure of either electrolytic or chemical manganese dioxide (EMD or CMD) in a hydrophobic cathode for zinc-air cells. While most crystal structures of manganese dioxide would provide operable zinc-air cathodes, it has been discovered that there are performance advantages gained by using the gamma structure in hydrophobic cathodes. There is also some benefit to be gained by using a gamma-beta mixture. It is believed that to some extent, in addition to oxygen, some amount of gamma manganese dioxide is reduced during high rate discharge and then is reoxidized by peroxides generated during discharge. The result is a higher operating voltage under high rate conditions. In contradistinction, the prior art chemical methods generally form beta manganese dioxide, thus limiting prior art hydrophobic cathodes to this crystal structure.

Generally, carbons having a surface area of between 50-250 $m^2$/gram or higher are operable in the present invention. However, there is an additional benefit realized by the present invention in that high surface area carbon can be used in the admixture since there is no possibility of runaway chemical reactions. It is believed that high surface area carbon particles increase the effective surface area of the air cathode and provide more sites for the electrochemical reduction of oxygen. Therefore, carbon having at least 600 $m^2$/gram and preferably at least 1000 $m^2$/gram can be used in the method of this invention. Suitable high surface area carbon would include carbon black, activated carbon, and mixtures thereof. Suitable carbon black includes carbon black sold under trademarks Cabot Vulcan XC-72 and Black-Pearls 2000 and suitable activated carbon includes Norit SX Ultra C and Calgon RB-Carbon. Graphite, such as sold under trademarks Lonza LN-44, KS-15, and KS-2.5, may also be added to enhance conductivity.

A cathode mix is made from the admixture of carbon and manganese dioxide by blending at least 20% by weight of a polymeric binding material therein. The polymeric binding material should be non-polar, such as a polymeric halogenated hydrocarbon, so that the resulting fabricated cathode is hydrophobic. A preferably polymeric binder is a polymeric fluorinated hydrocarbon such as fluorinated ethylene, propylene, butene, pentene and mixtures thereof. If less than 20% polymeric material is used the cathode remains hydrophilic and electrode flooding occurs while greater than 40% polymeric material will interfere with the electrolyte-catalyst interface. The polymeric material of choice is polytetrafluoroethylene. It can be added to the admixture as an aqueous dispersion or as a powder. The blending step is continued until a cathode mix is obtained which has a uniform viscosity. This step is generally much shorter than the attrition milling step. A cathode mix thus formed can then be fabricated into a cathode.

One procedure for fabricating a cathode is carried out by heating the cathode mix between 100° and 250° C. is remove all of the water, pulverizing and sieving the dried cathode mix to obtain a uniform mixture of agglomerated manganese dioxide and carbon, applying a uniform thickness of the agglomerated particles onto a belt supported metal grid, and compressing the layer on the grid to the desired thickness and density.

A second procedure for fabricating a cathode is carried out by coating a uniform layer of the cathode mix onto a metal grid, heating the coated grid to remove the water, and compressing the coated grid to the desired thickness and density.

Both of the above procedures can be carried out in a continuous process to form a continuous sheet of dried hydrophobic cathode. The cathode sheet can be cut to the appropriate size for use in zinc-air cells. As is customary in the art, a sheet of microporous hydrophobic film can be applied to the side of the cathode which will be exposed to air while an electrolyte wettable microporous film can be applied to the side of the cathode exposed to the electrolyte.

The features and advantages of the present invention will be clear from the following examples in which all parts are parts by weight unless otherwise specified.

COMPARATIVE EXAMPLE A

This example demonstrates a typical, commercial scale manufacture of a hydrophobic air cathode wherein manganese dioxide is formed by a chemical method. Eleven parts of carbon black (Vulcan XC72) and 45 parts distilled water are mixed in a conventional mixer for 30 minutes. A polytetrafluoroethylene dispersion is prepared by adding 22 parts of Teflon emulsion (Dupont TFE 30, 60% solids) to 22 parts distilled water and mixing vigorously for 10 minutes. This dispersion is added to the aqueous carbon dispersion and mixed for about 30 minutes. Fourteen parts of manganese nitrate are then added followed by mixing for 15 minutes. This slurry is then transferred to an oven and heated at between 150° and 200° C. for 131 hours to convert the manganese nitrate to manganese dioxide and to remove the water. The hardened, dried carbon- Telfon-manganese dioxide mixture is pulverixed and sieved. The seived cathode material is then pressed onto a metal grid to form cathodes. Total processing time is 135-140 hours. The final cathode is comprised of 48% Teflon, 11% beta-$MnO_2$, and 41% carbon.

EXAMPLE 1

One part of Kerr McGee electrolytic gamma-manganese dioxide (average particle size=55 microns) and 12 parts distilled water are placed in the container of an attrition mill*. The milling media comprises 21 pounds of 0.25 inch diameter ceramic balls and said media is added to the aqueous manganese dioxide dispersion in the attrition mill container. The gamma manganese dioxide is dispersed, ground, rubbed, and beaten in the attritor mill by the rotating arms and the milling media. A sample of the resulting aqueous dispersion of manganese dioxide is analyzed using a Leeds Northrop Micro-Trac Particle Size Analyzer having a channel range of 1.9 to 250 microns. The mean diameter of the manganese dioxide particles within this channel range is 4 microns while 100% of the particles are less than 8 microns in diameter.

*(Model 1-S Attritor, Union Process Inc., Akron, Ohio)

EXAMPLE 2

An aqueous dispersion of manganese dioxide is prepared as described in Example 1. Two parts carbon black (Black Pearls 2000, surface area=1475 $m^2$/gram) per part aqueous dispersion and 21 parts distilled water per part aqueous dispersion are added to the attritor mill. Admixing is carried out by milling this mixture for 30 minutes. The admixtures of discrete particles of gamma manganese dioxide and carbon is transferred to a lab high speed mixer. One part Teflon emulsion (Dupont, TFE 30, 60% solids) is added to 23 parts of the admixture and blended for 10 minutes in the mixer. The cathode mix obtained is dried for 24 hours at 110° C. and then pulverized and sieved to obtain a uniform mixture of clusters of Teflon, manganese dioxide and carbon particles. These clusters are fabricated into a cathode by applying a uniform layer of cluster onto a metal grin and compressing the layer and grid to the desired thickness and density. A coherent sheet of cathode having the cathode material adhered to one side of a metal grid is thus obtained. Total processing time is less than a quarter of the time required for processing the material of Comparative Example A. The hydrophobic cathode comprises a compressed admixture of discrete particles of gamma manganese dioxide and carbon together with polytetrafluoroethylene having a composition of 22% gamma-manganese dioxide, 52% carbon, and 26% Teflon.

EXAMPLE 3

Ten 675 size Zn-air cells are built, each having a zinc anode, an alkaline electrolyte, and a hydrophobic cathode made as described in Examples 1 and 2. These cells are used to generate capacity-voltage curves at an 8 milliamp constant current discharge. For comparison, ten cells are also built wherein the cathode is made in accordance with Comparative Example A. These prior art cells deliver 400 mA-Hr to a one volt cut off while the cells having cathodes made according to this invention deliver 430 mA-Hr to a one volt cutoff, a 7.5% improvement. Additionally, the cells having cathodes made in accordance with this invention deliver the first 400 mA-Hr of capacity at 300-400 millivolts higher than the prior art cells.

EXAMPLE 4

Four 675 Zn-air cells are built as described above having cathodes made in accordance with this invention. These cells are subjected to a 35 mA pulse test and the time it takes the voltage to fall to one volt is measured. This test is intended to simulate use in certain types of hearing aids. More than 6 seconds above one volt is required to pass this test. These cells sustained a voltage above one volt for an average of 12-13 seconds. For comparison, four cells having cathodes made in accordance with Comparative Example A sustained a voltage above one volt for an average of 5-6 seconds.

The above examples demonstrate that hydrophobic air cathodes made in accordance with the present invention are a significant improvement over prior art cathodes. In addition, the method of making the air cathodes according to this invention is faster, more economical, and avoids the problems inherent in prior art methods.

While the examples used an attrition mill made by Union Process Inc. other attrition mills are equally suitable. Other useful mills include those sold under the trademarks EMCO SW Mill and EMCO X-ENTRY Mill. The length of time for the milling depends on the initial average particle size of the manganese dioxide. Under the milling conditions set forth in Example 1, if the initial average particle size is about 100 microns it will take longer than 3 hours while an initial average particle size less than 50 microns will take less than 3 hours.

The polymeric fluorinated hydrocarbon blended into the admixture can be a solid powder as well as an aqueous dispersion such as used in Example 2. An example of a suitable solid powder is Dupont Teflon TFE 65 fluorocarbon resin which is a free flowing aggregate of fine powder.

It is clear that deviations can be made from the specific examples and still remain within the scope of this invention. Therefore, the examples are to be viewed as illustrative only and not as a limitation on the invention as claimed.

What is claimed is:

1. A zinc-air electrochemical cell having an anode comprised of zinc, an alkaline electrolyte, and a hydrophobic cathode; wherein hydrophobic the cathode comprises an admixture of discrete particles of gamma manganese dioxide and carbon and at least 20% of a polymeric halogenated hydrocarbon binder.

2. The electrochemical cell of claim 1 wherein said manganese dioxide is present in an amount of at least 20%.

3. The electrochemical cell of claim 1 wherein aid manganese dioxide has an average particle size of 10 microns or less.

4. The electrochemical cell of claim 1 wherein said carbon is selected from the group consisting of carbon black, activated carbon, graphite, and mixtures thereof.

5. The electrochemical cell of claim 4 wherein said carbon has a surface area greater than 600 $m^2$/gram.

6. The electrochemical cell of claim 1 wherein said manganese dioxide has an average particle size less than 7 microns and said carbon has a surface area of at least 100 $m^2$/gram.

7. The electrochemical cell of claim 1 wherein said manganese dioxide comprises electrolytic gamma manganese dioxide and said polymeric halogenated hydrocarbon comprises polytetrafluoroethylene.

8. A method of making a hydrophobic cathode for use in a zinc-air cell, comprising the steps of intensively milling gamma manganese dioxide particles, admixing the milled manganese dioxide particles and carbon particles, blending a polymeric halogenated hydrocarbon into the admixture to form a cathode mix, and fabricating the cathode mix into a cathode.

9. The method of claim 8 wherein said milling comprises dispersing, grinding, beating, and rubbing manganese dioxide particles having a particle size greater than about 10 microns until said manganese dioxide has an average particle size which is less than about 10 microns.

10. The method of claim 8 wherein said manganese dioxide being intensively milled is an aqueous dispersion of manganese dioxide.

11. The method of claim 9 wherein said carbon particles are admixed with the manganese dioxide before the milling is completed.

12. The method of claim 8 wherein said milling is carried out until said manganese dioxide has an average particle size not greater than about 7 microns.

13. The method of claim 8 wherein said carbon is selected from the group consisting of carbon black, activated carbon, graphite, and mixtures thereof.

14. The method of claim 13 wherein said carbon has a surface area greater than about 600 $m^2$/gram.

15. The method of claim 8 wherein said polymeric halogenated hydrocarbon comprises polytetrafluoroethylene and said manganese dioxide comprises electrolytic manganese dioxide.

16. The method of claim 8 wherein said cathode is fabricated by heating the cathode mix between 100° and 250° C. to remove the water; pulverizing and sieving the dried cathode mix to obtain agglomerates of polytetrafluoroethylene, manganese dioxide particles, and carbon particles; applying a uniform layer of said clusters onto a metal grid; and pressing to form a cathode sheet.

17. A method of making a hydrophobic cathode for use in a zinc-air cell comprising the steps of attrition milling an aqueous dispersion of gamma manganese dioxide until the average particle size is less than about 7 microns; then forming an admixture of discrete particles of the milled manganese dioxide and particles of carbon, wherein said carbon comprises carbon having a surface area of at least 1000 $m^2$/gram; then blending polytetrafluoroethylene into said admixture to form a cathode mix; and then fabricating the cathode mix into a cathode; wherein said cathode mix comprises at least 20% said manganese dioxide and 20% polytetrafluoroethylene.

18. The method of claim 17 wherein said cathode mix is fabricated into a cathode by pressing said cathode mix.

19. The method of claim 17 wherein said manganese dioxide is electrolytic manganese dioxide.

* * * * *